United States Patent [19]

Prince et al.

[11] 3,997,940
[45] Dec. 21, 1976

[54] DOUBLE-RAIL ANIMAL SECURING ASSEMBLY

[75] Inventors: Ralph P. Prince, Storrs; Paul E. Belanger, Mansfield Center, both of Conn.; Rudy G. Westervelt, Newfield, N.Y.

[73] Assignee: Council of Livestock Protection, Inc., New York, N.Y.

[22] Filed: Oct. 1, 1975

[21] Appl. No.: 618,433

[52] U.S. Cl. .................................. 17/1 A; 119/99
[51] Int. Cl.² ........................................ A22B 1/00
[58] Field of Search .............. 17/1 A, 1 R; 119/99, 119/98, 147, 96, 13, 20

[56] References Cited
UNITED STATES PATENTS

| | | | |
|---|---|---|---|
| 2,650,567 | 9/1953 | Whitworth | 119/99 |
| 2,995,111 | 8/1961 | Darden | 119/99 |
| 3,087,195 | 4/1963 | Marshall et al. | 119/99 |

FOREIGN PATENTS OR APPLICATIONS

| | | | |
|---|---|---|---|
| 212,726 | 2/1958 | Australia | 119/98 |
| 254,201 | 9/1964 | Australia | 119/99 |
| 250,400 | 3/1964 | Australia | 119/99 |
| 222,776 | 7/1959 | Australia | 17/1 A |

Primary Examiner—Louis G. Mancene
Assistant Examiner—James D. Hamilton
Attorney, Agent, or Firm—Moonray Kojima

[57] ABSTRACT

A set of two parallel rails is used to hold animals being slaughtered. The animal's four legs straddle the two rails and the body rests on the rails. A back retraining device is provided to hold the rump and back securely on the rails. A device is also provided for restraining and stretching the neck upward so that ritual slaughter can be performed.

2 Claims, 2 Drawing Figures

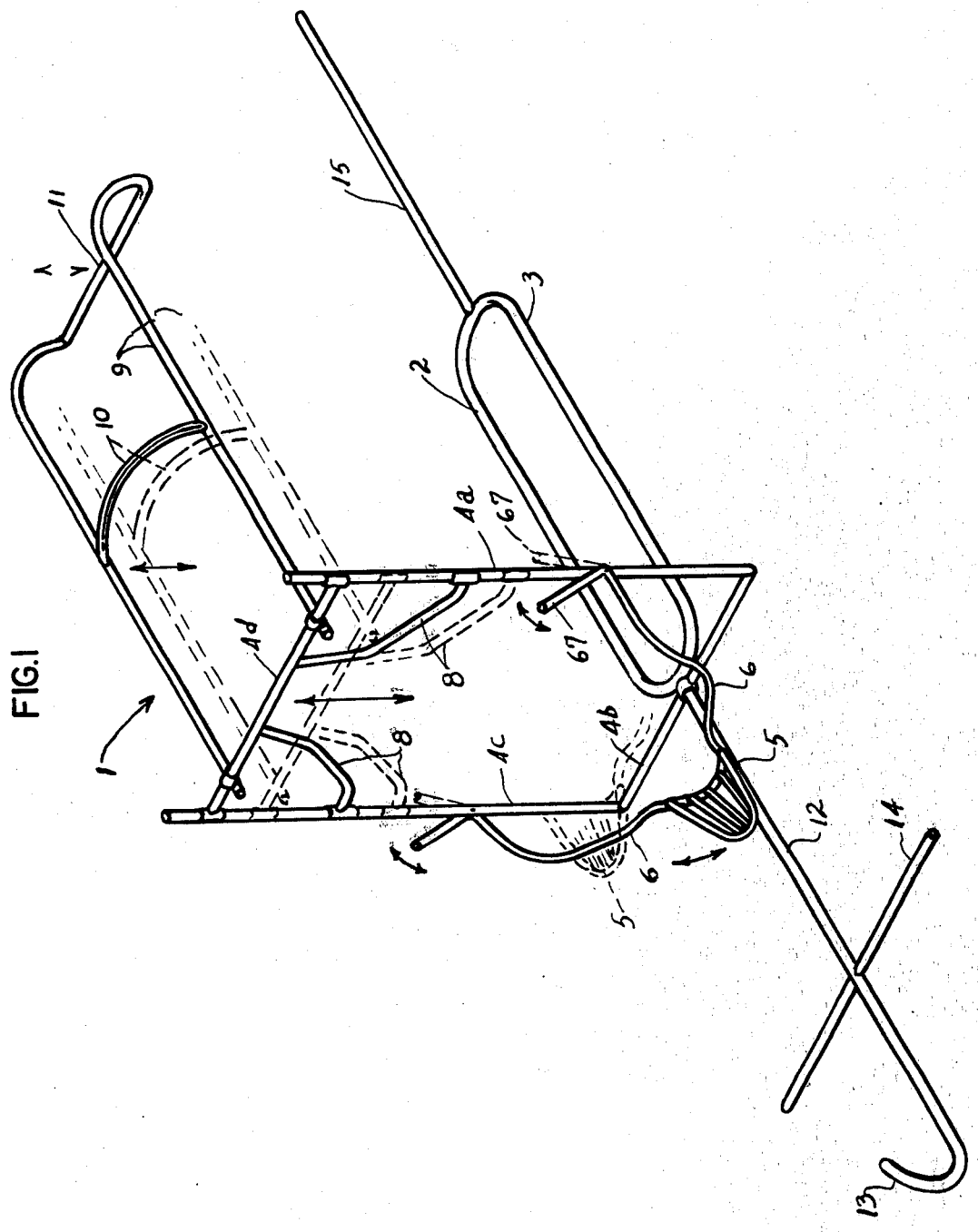

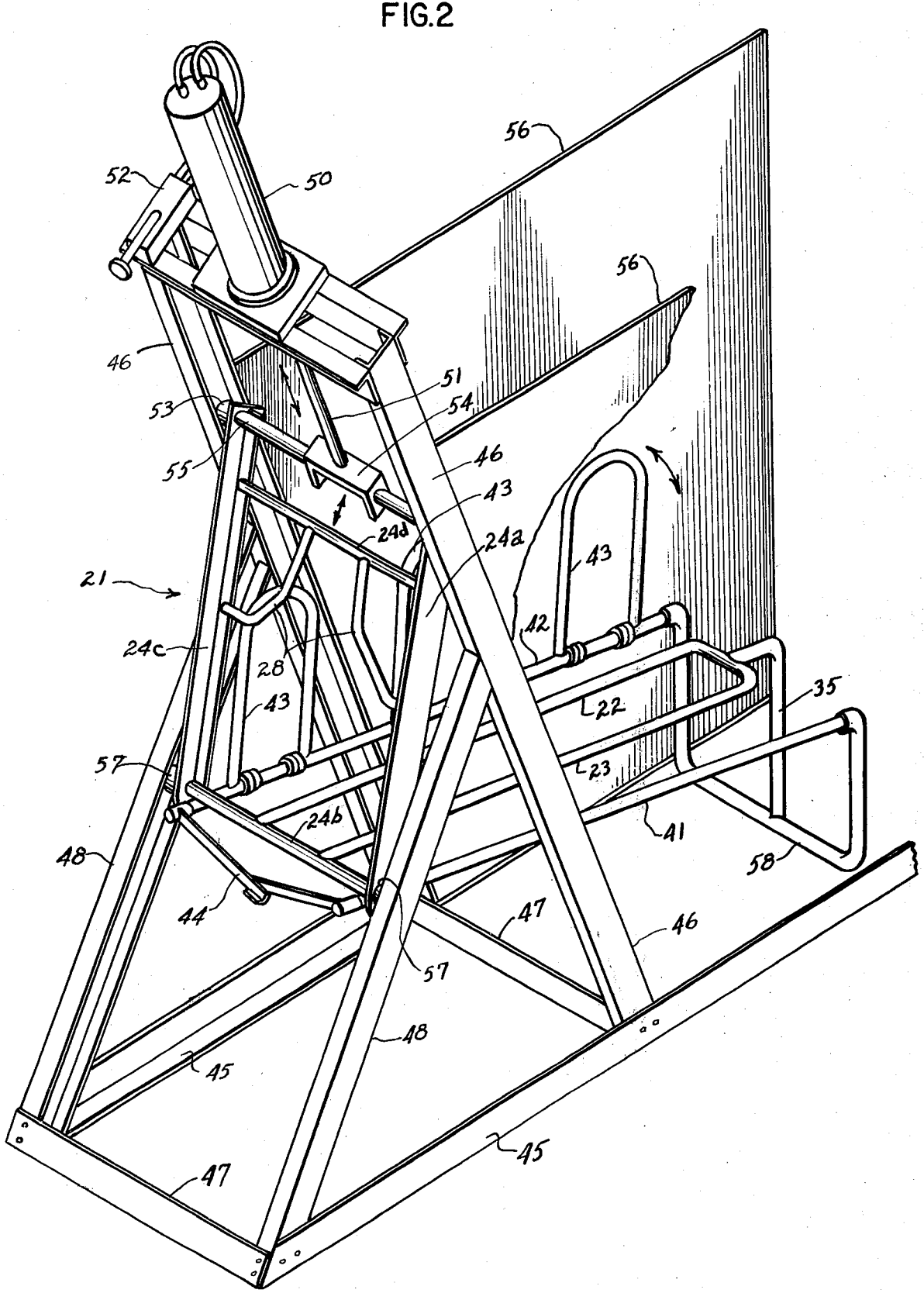

DOUBLE-RAIL ANIMAL SECURING ASSEMBLY

This invention relates to a conveyor system used to slaughter animals.

Briefly, the invention encompasses a manually or mechanically operated yoke comprising a pair of horizontally disposed parallel rails connected to a frame having suitably spaced bars through which the animal's neck may be placed, a back frame which is suitably fit over the animal's back for restraining same, and a neck stretcher. One or more yokes may be adapted to be moved together slidably by motor means.

A feature of the invention is the pair of parallel horizontally positioned rails used to hold animals to be slaughtered.

Other features of the invention are a device for holding the jaws of the animal and pivotally movable upward to stretch the neck of the animal; a frame having suitable bars for restraining the neck of the animal and a frame for holding the back of the animal.

The invention will now be further illustrated with reference to drawings, in which:

FIG. 1 depicts an illustrative embodiment of the invention; and

FIG. 2 depicts an alternative illustrative embodiment of the invention.

Turning now to FIG. 1, there is depicted a yoke 1 which may be used for holding, restraining and transporting an animal to be slaughtered. The yoke comprises a pair of interconnected rails or pipes 2,3 connected to a U-shaped frame 4a, 4b, 4c, as depicted. Pivotally connected to frames 4a, and 4c by arm 7, is a jaw basket 5. The jaw basket may be pivoted vertically, as shown by arrows 8, by means of manually operated arm extensions 7.

Also connected to frame 4a,4c and 4d are a pair of flexible strips 8 suitably shaped and sized to restrain the neck of the animal. Also, connected to frame 4d is a suitably shaped and sized back frame 9 having a pair of parallely extending bars interconnected by a semi-circular cross bar 10 suitable for fitting over the back of the animal, and a circular end bar 11 disposed below the plane of the parallel bars 9, as shown. The frame 4d, flexible strips 8 and body frame 9 are movably attached to frame 4a and 4c by suitable attaching means.

Attached to the frame 4b is an extension rod 12 having a hooklike end portion 13 and perpendicularly attached thereto rod 14. To the end of rails 2,3 there is connected another rod 15.

In operation, an animal, such as a lamb or calf, is placed within the yoke 1 so that the neck is within the neck restraining strips 8 and the head is out in the front thereof within frame 4a, 4b, 4c and the body is over the pair of rails 2,3 with the four legs of the animal straddling the rails. The rails and yokes may be lifted up via rod 14 by means not shown so that the legs of the animal do not touch the floor and the yoke may be moved forward by attaching motor means to hooked end 13. For ritual or kosher slaughter, the neck of the animal must be stretched and held relatively stable. This may be done manually by turning the arm extension 7 to the right and causing the jaw basket 5 connected to arm 6 to pivot upwardly to catch the jaw of the animal and force same upward thereby stretching the neck and holding the neck relatively stable. By appropriate adjustment of the neck restrainer strips 8, and back frame 9, the animal will be held firmly on rails 2,3 with its legs straddling the rails. The means for holding the yoke and moving same are now shown but may be any suitable arrangement. The yoke need not be moved, except to cause the legs of the animal to be off the floor. Otherwise, the yoke can be stationary and the slaughter operation carried out at that site.

Turning now to FIG. 2, an air operated yoke system 21 is shown similar to although not the same as system components in FIG. 1. The system comprises a pair of horizontally disposed parallel rails 22,23, connected to lower frame bar 24b and also connected to extension bar 35. The frame bar 24b is connected to side frame bars 24a and 24c, as depicted. Connected to the side frame bar 24a and 24c are neck restraining strips 28 and upper frame bar 24d which form the neck restraining means similar to that in FIG. 1.

The frame is movably connected to outer support frame comprising U-shaped bars 46 and 48 by means of bearings 53 and 57, respectively. Thus, as rod 51 driven by air cylinder 50, and controlled by control 52, is moved upward or downward, such motion is transmitted through connector 54 and rod 55 to move the upper frame 24 angularly upward with movement of bearings 53, and the lower frame 24b to move angularly upward in another direction on track 48 by movement of bearings 57. The air cylinder may be controlled suitably by control means 52. The outer frame comprising the U-shaped frames 46 and 48 holding the bearings 53 and 57 are connected in an "A" arrangement as depicted. They are held stably by side frame bars 45 and cross bars 47. The entire unit may be stationary and held by walls 56.

Also connected to frame 24a and 24c are parallely disposed side bars 41 and 42 which are suitably spaced from rails 22,23, and may be used to stably hold the animal. The right end of the outer bars 41,42 are connected together with extension rod 35 and horizontal bar 35 and at the left end by adjustable frame 44. Connected movably to side bars 42 are circularly shaped frame 43 which are movable in a plane perpendicular to the plane of rails 22,23 and may be used to hold stably the back of the animal. The bar 58 may rest on the floor and form support for rails 22,23.

In operation, the cylinder 50 has rod 51 in an extended position and the frame 24 at its lowest position with rails 22,23 substantially parallel to the floor. An animal is caused to move onto the yoke with its legs between rails 22,23 and outer bars 41,42, and its head through the frame 24 and neck restraining bars 28. Then, air cylinder 50, is operated by control 52 to lift up frame 24 and the front or left end of bars 22,23 with bars 58 and 35 supporting the rails with the animal on them. Before this is done, the back restrainer may be operated to restrain and hold the animal on the rails. By lifting the front end, the animals legs will be off the floor and the animal immobilized. The neck and back will be restrained. A neck stretcher, such as disclosed in FIG. 1 may be used. Also, the entire frame unit comprising 45,46,47,48, etc, may be moved horizontally in an assembly line by means not shown.

The foregoing description illustrates the principles of this invention. Numerous other variations and modifications thereof would be apparent to the worker skilled in the arat. All such variations and modifications are to be considered to be within the spirit and scope of the invention.

What is claimed is:

1. A double rail conveyor system for slaughtering animals, comprising a movable frame having a bottom bar and two parallel vertical bars extending upward from the ends of said bottom bar;

a set of two parallel horizontally disposed rails connected to said bottom bar;

a neck stretcher means comprising a jaw holder and a pair of rods connecting said jaw holder pivotally to said vertical bars of said frame and means for pivotally moving said jaw holder vertically about a pivot point on said vertical bars;

a pair of flexible strips mounted on said two vertical bars for holding the neck of said animal; and a back holding cage comprising a pair of horizontally disposed bars and a semicircular cross bar connected to said horizontally disposed bars, said pair of horizontally disposed bars connected movably to said vertical bars for holding the back of the animal, said back holding cage being vertically movable to come into contact with the back of the animal, whereby said animal is held in an upright position with its belly touching said parallel rails and with the parallel rails extending in the direction extending from the head to the tail of the animal and with its legs straddling said rails.

2. The conveyor system of claim 1, further comprising an extension attached to said frame, and wherein said parallel rails are connected together by connection means at the ends opposite the frame connection.

* * * * *